(12) United States Patent
Nakajima (10) Patent No.: US 9,352,465 B2
(45) Date of Patent: May 31, 2016

(54) CONTROL METHOD FOR ROBOT APPARATUS AND ROBOT APPARATUS

(71) Applicant: CANON KABUSHIKI KAISHA, Tokyo (JP)

(72) Inventor: Yohji Nakajima, Fuchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 14/537,745

(22) Filed: Nov. 10, 2014

(65) Prior Publication Data

US 2015/0134111 A1 May 14, 2015

(30) Foreign Application Priority Data

Nov. 12, 2013 (JP) ................................. 2013-233803

(51) Int. Cl.
*B25J 9/16* (2006.01)

(52) U.S. Cl.
CPC ..... *B25J 9/1664* (2013.01); *G05B 2219/39361* (2013.01); *G05B 2219/40515* (2013.01); *Y10S 388/903* (2013.01); *Y10S 901/09* (2013.01)

(58) Field of Classification Search
CPC .. B25J 9/1664; Y10S 901/09; Y10S 388/903; G05B 2219/39361; G05B 2219/40515
USPC .......... 700/245, 253; 901/9; 318/563, 568.12; 361/5, 23, 24; 388/903
See application file for complete search history.

(56) References Cited

U.S. PATENT DOCUMENTS

| 7,023,164 | B2 | 4/2006 | Ribe | |
|---|---|---|---|---|
| 2004/0124802 | A1* | 7/2004 | Brogardh | B25J 9/1664 318/568.22 |
| 2014/0257558 | A1* | 9/2014 | Frische | B25J 9/1664 700/245 |

* cited by examiner

*Primary Examiner* — Khoi Tran
*Assistant Examiner* — Robert Nguyen
(74) *Attorney, Agent, or Firm* — Canon USA, Inc., IP Division (57) ABSTRACT

A control method for a robot apparatus including a power supply unit, an articulated arm having a plurality of joints each having an actuator and a driver, and a control device includes determining by the control device whether a total of required power in all of the actuators is equal to or lower than an allowable power of the power supply unit by using a trajectory through teaching points for moving the articulated arm from a first position/attitude to a second position/attitude before the articulated arm starts moving, and if not, resetting by the control device the trajectory for moving the articulated arm from the first position/attitude to the second position/attitude to a trajectory causing a total of required powers in all of the actuators to be equal to or lower than the allowable power of the power supply unit.

9 Claims, 6 Drawing Sheets

CONTROL METHOD FOR ROBOT APPARATUS AND ROBOT APPARATUS

BACKGROUND OF THE INVENTION

1. Field of the Invention

The present invention relates to a control method for a robot apparatus and a robot apparatus for protecting a power supply unit in the robot apparatus utilizing an articulated arm to be driven by controlling a plurality of joints.

2. Description of the Related Art

In the past, robot apparatuses have been developed each having an articulated arm having a plurality of joints. An articulated arm utilized in such a robot apparatus may internally contain an actuator such as a motor in each of joints, and a driver (substrate) for controlling an operation is connected to each of the actuators. A power supply cable and a signal cable are connected to each of the drivers. The power supply cable is usable for supplying driving power from a power supply body, and the signal cable is usable for transmitting/receiving a control signal to/from a control device. Here, the part from the power supply body to the driver which receives driving power, that is, the power supply body, the power supply cable, the connector and so on will be collectively called a power supply unit.

In recent years, such robot apparatuses each including an articulated arm are increasingly being utilized for works such as automatic assembly works. In this case, because such an assembly work may require a high speed operation, the steep acceleration and deceleration of joints may be required for higher speed operations of the articulated arm. However, in order to achieve steep acceleration and deceleration of joints, a higher motor output may be required, which imposes an overload on the power supply unit and may possibly cause a malfunction of the articulated arm.

Furthermore, a reduced size of the power supply unit may prevent supply of power required for the articulated arm to operate, which may also impose an overload on the power supply unit. In this case, the articulated arm may operate at a required speed, which may also possibly impose a mechanical overload on joints.

In order to prevent such overloads on the power supply unit due to a larger amount of power required in such articulated arm than the power of the power supply unit, control over the articulated arm may be demanded such that a load on the power supply unit may be equal to or lower than an allowable value set based on performance of the power supply unit. U.S. Pat. No. 7,023,164 proposes an over-current protection device which includes a sensor for measuring an actual load acting on a power supply unit while an articulated arm is operating and detecting an overload by comparing the measured value and a threshold. In the overcurrent protecting apparatus, if the measured value is higher than the threshold, the robot apparatus is powered off immediately. This overcurrent protecting apparatus shuts down the robot apparatus if it is determined that an overload is imposed on the power supply unit such that a malfunctioning articulated arm may be prevented from continuously operating.

However, the overcurrent protection device disclosed in U.S. Pat. No. 7,023,164 may require immediate execution of a protection operation and shut down when occurrence of an overload is detected because a load on a power supply unit is measured after an articulated arm starts operating. This may possibly influence on an operation takt time of the robot apparatus.

SUMMARY OF THE INVENTION

A first aspect of the present invention provides a control method for a robot apparatus including a power supply unit, an articulated arm having a plurality of joints each having an actuator and a driver configured to adjust power of the power supply unit and supply it to the actuator, and a control device configured to control the driver such that power required for an operation of the actuator may be supplied from the power supply unit to the actuator to move a position/attitude of the articulated arm, the method including determining by the control device whether a total of required power in all of the actuators is equal to or lower than an allowable power of the power supply unit by using a trajectory through teaching points for moving the articulated arm from a first position/attitude to a second position/attitude before the articulated arm starts moving, and if the total of required power in all of the actuators is higher than the allowable power of the power supply unit, resetting by the control device the trajectory for moving the articulated arm from the first position/attitude to the second position/attitude to a trajectory causing a total of required powers in all of the actuators to be equal to or lower than the allowable power of the power supply unit.

Another aspect of the present invention provides a robot apparatus including a power supply unit, an articulated arm having a plurality of joints each having an actuator and a driver configured to adjust power of the power supply unit and supply it to the actuator, and a control device configured to control the driver such that power required for an operation of the actuator may be supplied from the power supply unit to the actuator to move a position/attitude of the articulated arm, wherein the control device determines whether a total of required power in all of the actuators is equal to or lower than an allowable power of the power supply unit by using a trajectory through teaching points for moving the articulated arm from a first position/attitude to a second position/attitude before the articulated arm starts moving, and if the total of required power in all of the actuators is higher than the allowable power of the power supply unit, the control device resets the trajectory for moving the articulated arm from the first position/attitude to the second position/attitude to a trajectory causing a total of required powers in all of the actuators to be equal to or lower than the allowable power of the power supply unit.

Further features of the present invention will become apparent from the following description of exemplary embodiments with reference to the attached drawings.

DESCRIPTION OF THE EMBODIMENTS

Embodiments of the present invention will be described in detail with reference to drawings.

Figure 1:
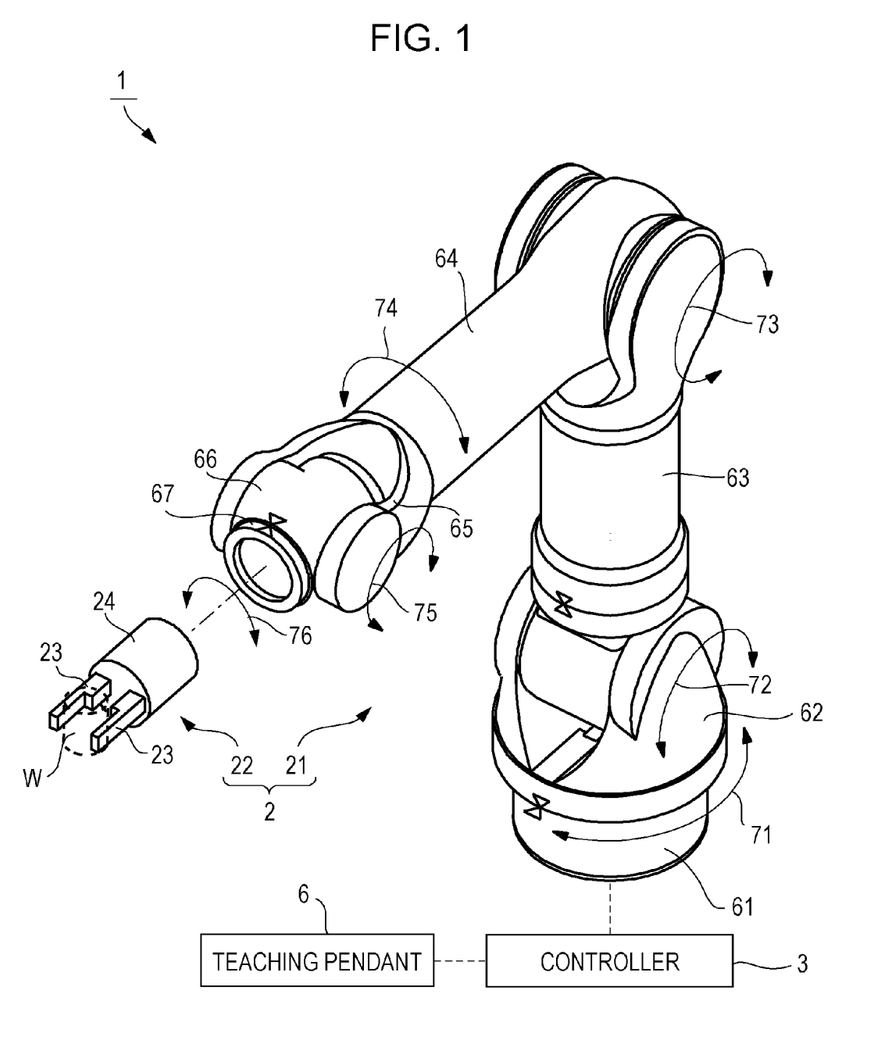
FIG. 1 schematically illustrates a configuration of a robot apparatus according to an embodiment of the present invention.

As illustrated in FIG. 1, a robot apparatus 1 includes a robot main body 2 that is an articulated robot and a controller 3 configured to control an operation of the robot main body 2.

The robot main body 2 has a 6-axis articulated arm (hereinafter, called an arm) 21 and a hand 22 which is an end effector. Though a 6-axis articulated arm is applied as the arm 21 according to this embodiment, the number of axes may be changed properly in accordance with the usage and purpose as far as a plurality of axes are provided. Though the hand 22 is applied as an end effector according to this embodiment, an embodiment of the present invention is not limited thereto. the hand 22 may include a general tool capable of moving a work W or performing a job on a work W.

The arm 21 includes seven links 61 to 67 and six joints 71 to 76 which connect the links 61 to 67 such that they may swing or rotate. The links 61 to 67 have a fixed length here. However, they may be expanded and contracted by a direct-acting actuator, for example.

Figure 2:
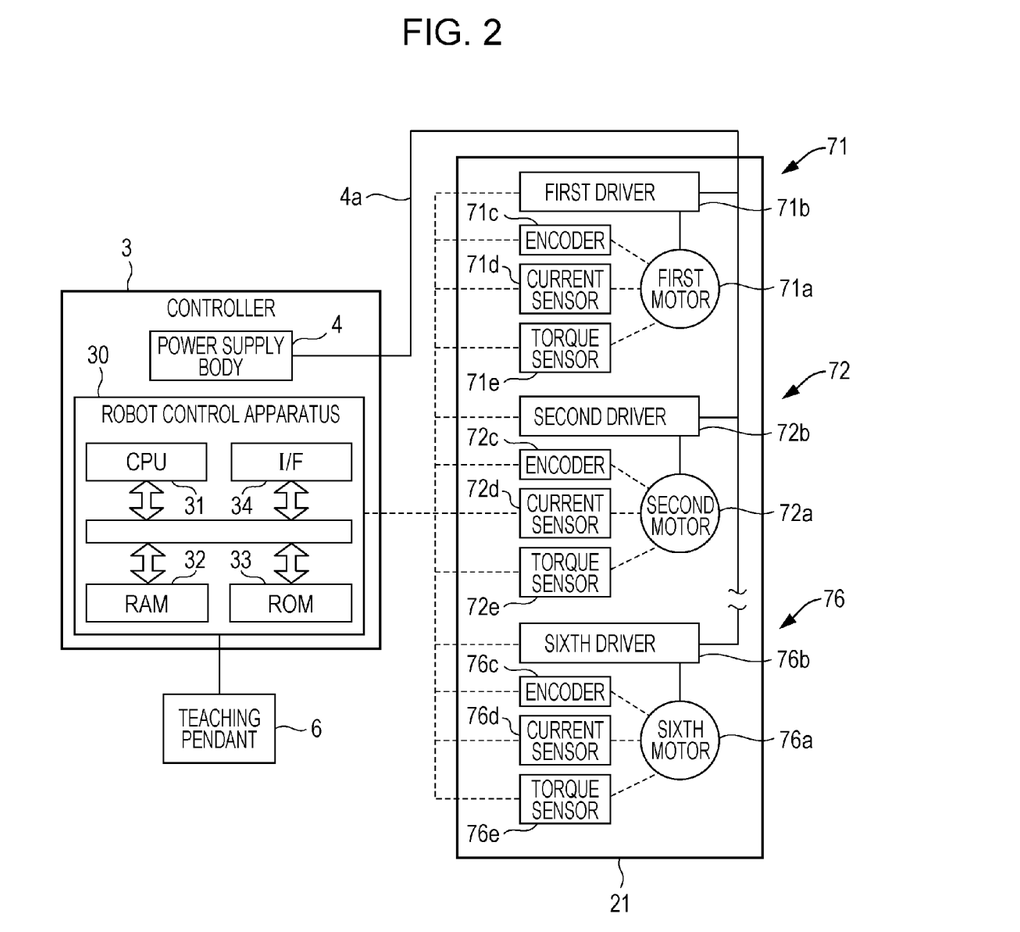
FIG. 2 schematically illustrates an electric system of a robot apparatus according to an embodiment of the present invention.

As illustrated in FIG. 2, the joints 71 to 76 include motors (actuators) 71a to 76a which drive the joints 71 to 76, respectively, and drivers 71b to 76b which control power to be supplied to the motors 71a to 76a, respectively. The joints 71 to 76 include encoders 71c to 76c which detect angles of rotations of the motors 71a to 76a and electric current sensors 71d to 76d which detect electric currents to be supplied to the motors 71a to 76a, respectively. The joints 71 to 76 further include torque sensors 71e to 76e which detect torque s of the joints 71 to 76, respectively. It should be noted that though the joints are rotatable joints in this embodiment, an embodiment of the present invention is not limited thereto. The joints may be direct-acting joints.

The drivers 71b to 76b are connected to a power supply body 4 of the controller 3, which will be described below, via a power supply cable 4a and receive power supply. The drivers 71b to 76b are further connected to the motors 71a to 76a to adjust power of the power supply body 4 to be supplied to the motors 71a to 76a as driving power. The drivers 71b to 76b, encoders 71c to 76c, electric current sensors 71d to 76d, and torque sensors 71e to 76e are all connected to a robot control device 30, which will be described below, in the controller 3.

As illustrated in FIG. 1, the hand 22 is attached and supported by a head end link 67 of the arm 21, and the arm 21 may be operated to adjust the position/attitude by at least one degree of freedom. The hand 22 has two fingers 23 and a hand body 24 which supports the fingers 23 so as to open and close the space between them. Bringing the fingers 23 close by performing a closing operation may allow the fingers 23 to grasp a work W. The hand body 24 includes a motor for operating the finger 23, an encoder which detects the angle of rotation of the motor, and a connection unit to be connected to the head end link 67.

As illustrated in FIG. 2, the controller 3 has the robot control device (controller) 30 and the power supply body 4. The power supply body 4 and the power supply cable 4a may configure a power supply unit.

The robot control device 30 may be configured by a computer to control the robot main body 2. A computer configuring the robot control device 30 may include, for example, a CPU 31, a RAM 32 which temporarily stores data, a ROM 33 which stores a program for controlling the components, and an input/output interface circuit (I/F) 34.

The robot control device 30 may control the drivers 71b to 76b to cause power required for operations of the motors 71a to 76a to be supplied from the power supply body 4 and power supply cable 4a to the motors 71a to 76a and thus move the position/attitude of the articulated arm 21.

The robot control device 30 is configured to set at least one of a moving speed and a trajectory of movements of the position/attitude of the articulated arm 21 before movement of the articulated arm 21 starts such that the a total of required peak powers of all of the motors 71a to 76a may be equal to or lower than an allowable power of the power supply body 4. Here, the term "required peak power" refers to a total of instantaneous powers required by the motors 71a to 76a. The robot control device 30 is further configured to set at least one of the moving speed and trajectory such that the moving period of time of the articulated arm 21 may be shorter than a predetermined time period of time.

A teaching pendant 6 is connectable to the robot control device 30. The teaching pendant 6 may be operated by a user to input and set a predetermined teaching point for the robot main body 2.

Next, a procedure for calculating a trajectory through teaching points set in robot apparatus 1 of this embodiment will be described by following the flowcharts illustrated in FIGS. 3 and 4. According to this embodiment, the robot control device 30 sets a passing time for each teaching point and, after the setting, sets the correction amount for the position/attitude of each teaching point. The setting process of the present invention includes the whole procedures illustrated in FIGS. 3 and 4.

Figure 3:
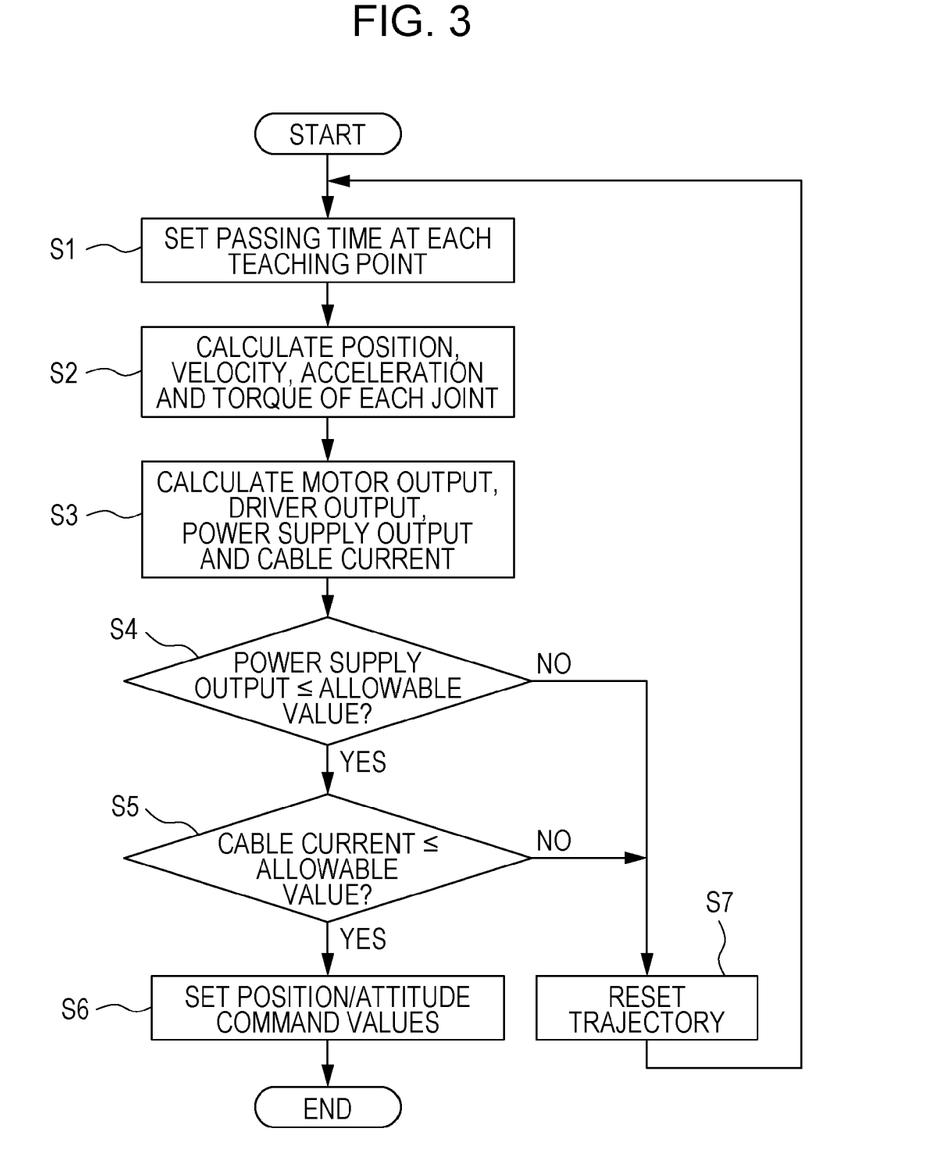
FIG. 3 is a flowchart illustrating processing steps of a first setting process according to an embodiment of the present invention.
Figure 4:
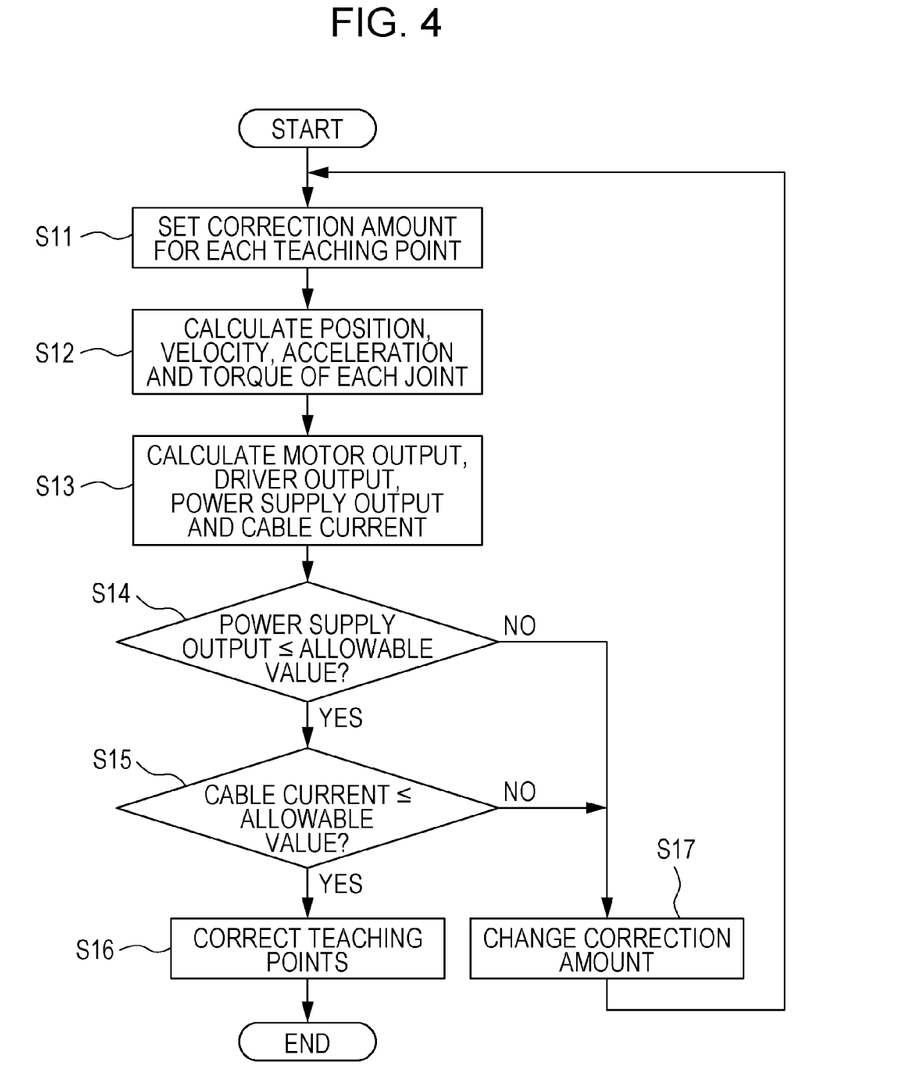
FIG. 4 is a flowchart illustrating processing steps of a second setting process according to an embodiment of the present invention.
Figure 5:
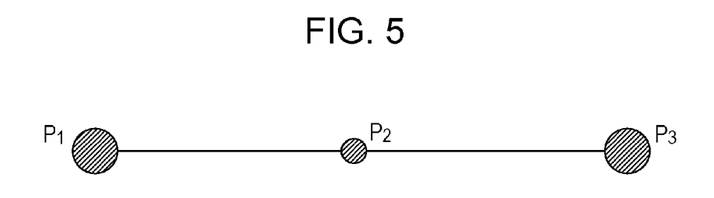
FIG. 5 illustrates teaching points of the first setting process according to an embodiment of the present invention.

As illustrated in FIG. 3, the robot control device 30 selects an operation start point (first position/attitude) and an operation end point (second position/attitude) among a plurality of set teaching points and sets a trajectory and passing times t between those teaching points (step S1). For example, as illustrated in FIG. 5, an operation start point P1 and an operation end point P3 are selected. Referring to FIG. 5, one interpolation point P2 is provided between P1 and P3, and a trajectory indicated by the solid line from P1 through P2 to P3 and passing times are determined. Though one interpolation point is provided in FIG. 5, no interpolation point or a plurality of interpolation points may be provided.

The robot control device 30 calculates a position $\theta(t)$, a speed $\omega(t)$, an acceleration $\alpha(t)$, and a torque $\tau(t)$ of each of the joints 71 to 76 at the teaching point with respect to the set passing time t (step S2). The values $\theta(t)$, $\omega(t)$, and $\alpha(t)$ are vectors vertically having the values of all of the joints 71 to 76. The torque $\tau(t)$ may be calculated by substituting the position $\theta(t)$, speed $\omega(t)$, and acceleration $\alpha(t)$ of each of the joints 71 to 76 into an equation of movement of the articulated arm 21.

The robot control device 30 acquires the motor revolutions and motor torques from the calculated positions $\theta(t)$, speeds $\omega(t)$, accelerations $\alpha(t)$, and torques $\tau(t)$ and then acquires motor outputs by integrating the motor revolutions and torques. A motor loss is added to each of the motor outputs to acquire a driver output. It should be noted that a driver output may be acquired with higher precision by dividing a motor output by a motor efficiency and by adding a driver loss after adding an iron loss or copper loss to the motor output. The driver loss is added to the driver output to acquire a power supply output. The outputs of the drivers 71b to 76b connected subsequently to the power supply cable 4a are added and are divided by a power supply voltage to acquire cable currents (step S3).

The robot control device 30 then determines whether the calculated power supply output is equal to or lower than a maximum output power (allowable value) which is an allowable power of the power supply body 4 or not (step S4). If so, the robot control device 30 determines whether the calculated cable current is equal to or lower than a maximum rated current (allowable value) which is an allowable power of the power supply cable 4a or not (step S5). If so, the robot control device 30 uses the passing times through the teaching points set in step S1 and, based on them, sets a position/attitude command value for the robot main body 2 (step S6).

The robot control device 30 controls a total of required peak powers of all of the motors 71a to 76a such that it may be equal to or lower than the allowable power of the power supply body 4 and such that the cable current based on the total of required peak powers may be equal to or lower than a maximum rated current of the power supply cable 4a. Thus, an overload on the power supply unit may be detected and may be addressed to suppress it.

On the other hand, if the robot control device 30 determines that the calculated power supply output is not equal to or lower than the maximum output power of the power supply body 4 or if the calculated cable current is not equal to or lower than the maximum rated current of the power supply cable 4a, the trajectory is reset (step S7). The robot control device 30 sets the passing time t at each of the teaching points again (step S1).

Figure 6:
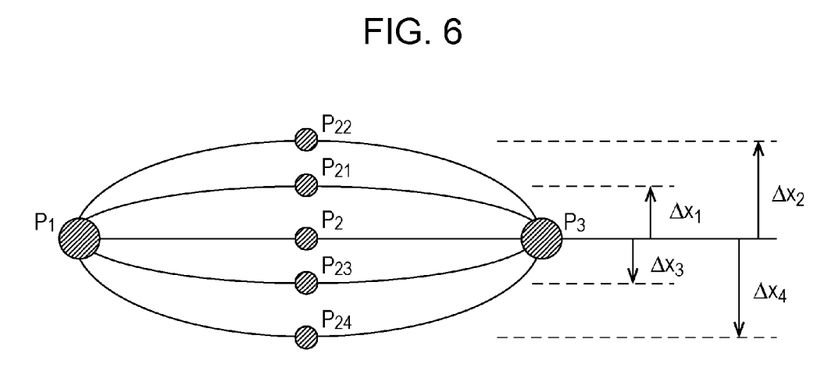
FIG. 6 illustrates teaching points of the second setting process according to an embodiment of the present invention.

The trajectory resetting process will be described. As illustrated in FIG. 4, the robot control device 30 sets a correction amount $\Delta x$ for a set teaching point (step S11). The correction amount $\Delta x$ and a relationship between teaching points and a trajectory will be described with reference to FIG. 6. The correction amount is a vector including 3 directions and 3 attitudes at a maximum, and four correction amount candidates ($\Delta x_1$ to $\Delta x_4$) are preset to prevent interferences of the robot. As described above, a robot tip moves on the trajectory from the teaching point $P_1$ through the teaching point $P_2$ to the teaching point $P_3$ before it is corrected. On the other hand, the robot tip moves on a trajectory after corrected from the teaching point $P_1$ through the teaching point $P_{21}$ to the teaching point $P_3$ after it is corrected. In other words, the teaching point $P_2$ is changed to the teaching point $P_{21}$, and the linear trajectory is changed to a smoothly curve one. A difference in position/attitude vector between the teaching point $P_2$ and the teaching point $P_{21}$ is a correction amount $\Delta x_1$.

The robot control device 30 calculates the position $\theta(t)$, speed $\omega(t)$, acceleration $\alpha(t)$, torque $\tau(t)$ of each of the joints 71 to 76 at each of the teaching points with respect to the set correction amount $\Delta x$ (step S12). The values may be calculated in the same manner as that in step S2 (see FIG. 3).

The robot control device 30 acquires a motor output, a driver output, a power supply output, and a cable current from the acquired position $\theta(t)$, speed $\omega(t)$, acceleration $\alpha(t)$, and torque $\tau(t)$ (step S13). The values may be calculated in the same manner as that in step S3 (see FIG. 3).

The robot control device 30 determines whether the power supply output calculated with respect to the reset trajectory is equal to or lower than a maximum output power (allowable value) which is the allowable power of the power supply body 4 or not. This determination is performed for the four correction amount candidates ($\Delta x_1$ to $\Delta x_4$) (step S14). If there is a correction amount $\Delta x$ with which the robot control device 30 may determine that the calculated power supply output is equal or lower than the maximum output power of the power supply body 4, whether the calculated cable current is equal to or lower than the maximum rated current (allowable value) which is the allowable power of the power supply cable 4a or not is determined. If there are a plurality of correction amounts $\Delta x$ with which it is determined that the calculated power supply output is equal to or lower than the maximum output power of the power supply body 4, whether the calculated cable current is equal to or lower than the maximum rated current (allowable value) which is the allowable power of the power supply cable 4a or not is determined for the plurality of correction amounts $\Delta x$ (step S15).

The correction amount $\Delta x$ is adopted, and the teaching points are corrected based on it. If there are a plurality of correction amounts $\Delta x$, a correction amount satisfying a predetermined condition is adopted among them. The predetermined condition may be a value of a smallest power supply output or a value of a smallest cable current (step S16). The correction amount is one of the candidates ($\Delta x_1$ to $\Delta x_4$). If it is determined in step 14 that there is not correction amount $\Delta x$ which is equal to or lower than the maximum output power (allowable value) or if it is determined in step 15 that there is no correction amount $\Delta x$ equal to or lower than the maximum rated current (allowable value), the correction amount is changed to a correction amount candidate that is not calculated (step S17), and the processing moves to step S11.

By performing these steps above, the trajectory is reset. The reset trajectory allows change of the moving speed of the articulated arm for moving from the first position/attitude to the second position/attitude. This is because the speed may be changed in a case where a margin is provided for the power supply output or cable output by the correction of the teaching points. For this reason, the passing time t is reset. The change of the moving speed will be described with reference to FIG. 7.

Figure 7:
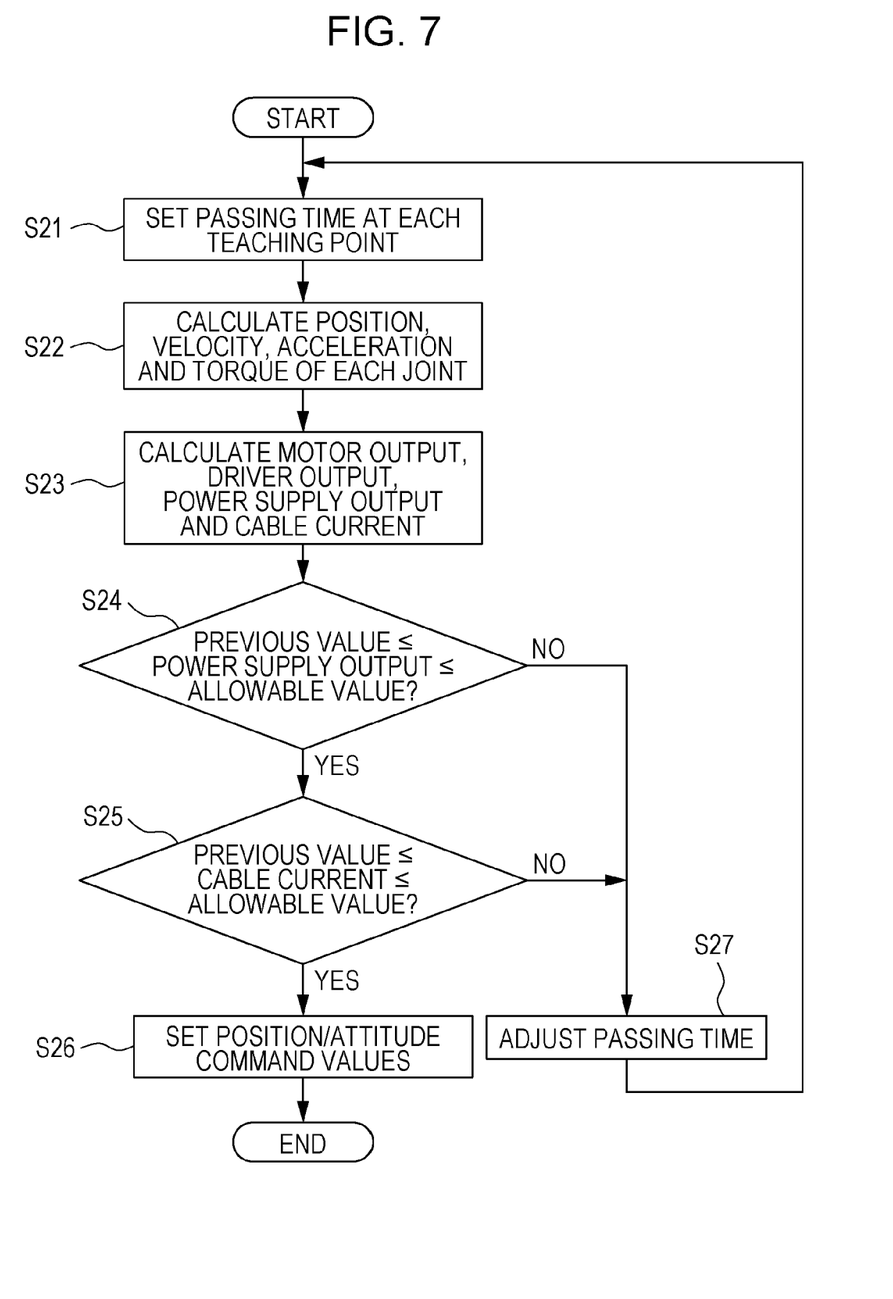
FIG. 7 is a flowchart illustrating processing steps of a third setting process according to an embodiment of the present invention.

As illustrated in FIG. 7, the robot control device 30 selects an operation start point (first position/attitude) and an operation end point (second position/attitude) from a plurality of set teaching points and sets a passing time t at the teaching point between them (step S21).

Steps S22 and S23 are the same as steps S2 and S3 described above.

The robot control device 30 then determines whether the calculated power supply output is equal to or higher than a previous value of the power supply output finally stored in step 16 and equal to or lower than the maximum output power (allowable value) which is the allowable power of the power supply body 4 or not (step S24). If so, the robot control device 30 determines whether the calculated cable current is equal to or higher than a previous value of the cable current finally stored in step 16 and equal to or lower than the maximum rated current (allowable value) which is the allowable power of the power supply cable 4a or not (step S25). If so, the robot control device 30 uses the passing time at the teaching point set in step S21 as they are and sets a position/attitude command value for the robot main body 2 based on them (step S26).

Therefore, the robot control device 30 may control such that a total of required peak powers of all of the motors 71a to 76a may be equal to or lower than the allowable power of the power supply body 4 and that the cable current based on the total of required peak powers may be equal to or lower than the maximum rated current of the power supply cable 4a and may select a trajectory satisfying the condition and allowing high speed driving.

On the other hand, if the robot control device 30 determines that the condition is not satisfied in step S24 or S25, the following process is performed. First, the robot control device 30 resets the passing times set in step S1 (step S27). Thus, the robot control device 30 resets the passing times t at the teaching points (step S21).

In the robot apparatus 1 of this embodiment as described above, the robot control device 30 determines before the articulated arm 21 starts to move whether the trajectory through the teaching points allows the maximum output power (allowable value) or lower and the maximum rated current (allowable value) or lower. If it is determined the trajectory through the teaching points causes the maximum output power (allowable value) or higher or the maximum rated current (allowable value) or higher, the trajectory of the articulated arm 21 is reset to a trajectory which causes the maximum output power (allowable value) or lower and the maximum rated current (allowable value) or lower. Thus, because the articulated arm 21 is not stopped due to the necessity for the resetting after the articulated arm 21 starts moving, an influence on the operation takt time may be suppressed. The robot control device 30 further controls such that a total of required peak powers of all of the motors 71a to 76a may be equal to or lower than the allowable power of the power supply unit. Therefore, an overload on the power supply unit of the articulated arm may be detected and may be addressed to suppress it.

Having described that, according to the embodiment, the robot control device 30 performs the determination step with respect to the power supply output and then the determination step with respect to the cable current (steps S4 and S5 in FIG. 3, and steps S14 and S15 in FIG. 4), an embodiment of the present invention is not limited thereto. These steps may be performed reversely, or one of them may be performed. Furthermore, the determination step or steps may be performed with respect to voltage to be applied to the connector, for example by comparing with an allowable value or a previous value.

Having described that, according to the embodiment, the passing times t at teaching points are set first (FIG. 3), the correction amounts Δx at the set teaching points are set (FIG. 4), and the passing times t are reset finally (FIG. 7), an embodiment of the present invention is not limited thereto. For example, these steps may be performed reversely or may be performed simultaneously.

The processing operations according to this embodiment are specifically executed by the robot control device 30. Thus, it may be achieved by supplying a recording medium storing robot control software programs for implementing the corresponding functions to the robot control device 30 and causes the CPU 31 to read and execute the robot control programs stored in the recording medium. In this case, the programs read out from the recording medium implement the corresponding functions of the embodiment, and the programs and the recording medium storing the programs are included in the present invention.

Having described the example in which the computer-readable recording medium is the ROM 33 and programs are stored in the ROM 33, an embodiment of the present invention is not limited thereto. The programs may be stored in a computer-readable recording medium or any other recording medium. For example, the recording medium which supplies the programs may be an HDD, an external storage device, a recording disk or the like.

According to the present invention, a control device determines whether the trajectory through teaching points provides the allowable power or lower and resets a trajectory which allows the allowable power or lower before the articulated arm starts moving. Thus, because the articulated arm is not stopped due to the necessity for the resetting after the articulated arm starts moving, an influence on the operation takt time may be suppressed. The robot control device further controls such that a total of required peak powers of all actuators may be equal to or lower than the allowable power of the power supply unit. Therefore, an overload on the power supply unit of the articulated arm may be detected and may be addressed to suppress it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-233803, filed Nov. 12, 2013 which is hereby incorporated by reference herein in its entirety.

What is claimed is:

1. A control method for a robot apparatus including
   a power supply unit;
   an articulated arm having a plurality of joints each having an actuator and a driver configured to adjust power of the power supply unit and supply it to the actuator; and
   a control device configured to control the driver such that power required for an operation of the actuator may be supplied from the power supply unit to the actuator to move a position/attitude of the articulated arm, the method comprising:
   determining by the control device whether a total of required power in all of the actuators is equal to or lower than an allowable power of the power supply unit by using a trajectory through teaching points for moving the articulated arm from a first position/attitude to a second position/attitude before the articulated arm starts moving; and
   if the total of required power in all of the actuators is higher than the allowable power of the power supply unit, resetting by the control device the trajectory for moving the articulated arm from the first position/attitude to the second position/attitude to a trajectory causing a total of required powers in all of the actuators to be equal to or lower than the allowable power of the power supply unit.

2. The control method for the robot apparatus according to claim 1, further comprising changing a moving speed for moving the articulated arm from the first position/attitude to the second position/attitude by the control device such that the reset trajectory causes the total of required powers in all of the actuators to be equal to or lower than the allowable power of the power supply unit.

3. The control method for the robot apparatus according to claim 1, wherein
   the power supply unit includes a power supply body and a power supply cable usable for connecting the power supply body and the driver; and
   the allowable power in the determining is a maximum output power of the power supply body.

4. The control method for the robot apparatus according to claim 1, wherein
   wherein the power supply unit includes a power supply body and a power supply cable usable for connecting the power supply body and the driver; and
   the allowable power in the determining is calculated based on a maximum rated current of the power supply cable.

5. A non-transitory computer-readable recording medium storing a program causing a computer to execute a control method for a robot apparatus including
   a power supply unit;
   an articulated arm having a plurality of joints each having an actuator and a driver configured to adjust power of the power supply unit and supply it to the actuator; and
   a control device configured to control the driver such that power required for an operation of the actuator may be supplied from the power supply unit to the actuator to move a position/attitude of the articulated arm, the method comprising:
   determining by the control device whether a total of required power in all of the actuators is equal to or lower than an allowable power of the power supply unit by using a trajectory through teaching points for moving the articulated arm from a first position/attitude to a second position/attitude before the articulated arm starts moving; and if the total of required power in all of the actuators is higher than the allowable power of the power supply unit, resetting by the control device the trajectory for moving the articulated arm from the first position/attitude to the second position/attitude to a trajectory causing a total of required powers in all of the actuators to be equal to or lower than the allowable power of the power supply unit.

6. A robot apparatus comprising:
a power supply unit;
an articulated arm having a plurality of joints each having an actuator and a driver configured to adjust power of the power supply unit and supply it to the actuator; and
a control device configured to control the driver such that power required for an operation of the actuator may be supplied from the power supply unit to the actuator to move a position/attitude of the articulated arm, wherein
the control device determines whether a total of required power in all of the actuators is equal to or lower than an allowable power of the power supply unit by using a trajectory through teaching points for moving the articulated arm from a first position/attitude to a second position/attitude before the articulated arm starts moving; and if the total of required power in all of the actuators is higher than the allowable power of the power supply unit, the control device resets the trajectory for moving the articulated arm from the first position/attitude to the second position/attitude to a trajectory causing a total of required powers in all of the actuators to be equal to or lower than the allowable power of the power supply unit.

7. The robot apparatus according to claim 6, wherein the control device changes a moving speed for moving the articulated arm from the first position/attitude to the second position/attitude such that the reset trajectory causes the total of required powers in all of the actuators to be equal to or lower than the allowable power of the power supply unit.

8. The robot apparatus according to claim 6, wherein
the power supply unit includes a power supply body and a power supply cable usable for connecting the power supply body and the driver; and
the allowable power is a maximum output power of the power supply body.

9. The robot apparatus according to claim 6, wherein
wherein the power supply unit includes a power supply body and a power supply cable usable for connecting the power supply body and the driver; and
the allowable power is calculated based on a maximum rated current of the power supply cable.

* * * * *